United States Patent
Kim et al.

(10) Patent No.: US 6,191,828 B1
(45) Date of Patent: Feb. 20, 2001

(54) POSITION SENSIBLE LIQUID CRYSTAL DISPLAY DEVICE

(75) Inventors: Chee Young Kim, Kyungki-do; Jun Hee Kim, Seoul; Young Soo Ahm, Kyungki-do, all of (KR)

(73) Assignee: LG Electronics Inc., Seoul (KR)

(*) Notice: Under 35 U.S.C. 154(b), the term of this patent shall be extended for 0 days.

(21) Appl. No.: 09/335,466

(22) Filed: Jun. 14, 1999

Related U.S. Application Data

(63) Continuation of application No. 08/916,532, filed on Aug. 22, 1997, now Pat. No. 5,963,277.

(30) Foreign Application Priority Data

| Aug. 24, 1996 | (KR) | 96-35318 |
| Oct. 31, 1996 | (KR) | 96-50670 |
| Oct. 31, 1996 | (KR) | 96-50674 |
| Dec. 23, 1996 | (KR) | 96-70362 |
| Feb. 5, 1997 | (KR) | 97-3618 |

(51) Int. Cl.$^7$ .................................................. G02F 1/1335
(52) U.S. Cl. ............................................. 349/12; 345/174
(58) Field of Search .................... 349/12, 23; 345/174

(56) References Cited

U.S. PATENT DOCUMENTS

| 4,853,493 | 8/1989 | Schlosser et al. |
| 4,929,934 * | 5/1990 | ueda et al. ............................ 340/706 |
| 4,975,692 | 12/1990 | Tateyama . |
| 5,239,700 | 8/1993 | Guenther et al. . |
| 5,300,858 | 4/1994 | Nikaido . |
| 5,311,342 | 5/1994 | Watanabe . |
| 5,488,498 | 1/1996 | Fujii et al. . |
| 5,550,659 | 8/1996 | Fujii et al. . |
| 5,568,292 | 10/1996 | Kim . |
| 5,659,332 | 8/1997 | Ishi et al. ............................. 349/12 |
| 5,677,744 | 10/1997 | Yoneda et al. ...................... 349/12 |
| 5,847,690 | 12/1998 | Boie et al. . |
| 5,940,065 * | 8/1999 | babb et al. .......................... 345/178 |

FOREIGN PATENT DOCUMENTS

| 9-113880 | 5/1997 | (JP) . |
| 9-113926 | 5/1997 | (JP) . |
| 9-114425 | 5/1997 | (JP) . |
| 9-114590 | 5/1997 | (JP) . |
| 9-114591 | 5/1997 | (JP) . |

OTHER PUBLICATIONS

J.H. Kim et al., "8.3: A Design of the Position–Sensitive TFT–LCD for Pen Application", SID 97 Digest, pp. 87–90, (1990).

* cited by examiner

*Primary Examiner*—James A. Dudek
(74) *Attorney, Agent, or Firm*—Finnegan, Henderson, Farabow, Garrett & Dunner, L.L.P.

(57) ABSTRACT

A position sensible liquid crystal display device includes a first substrate having a plurality of scanning lines, data lines, thin film transistors and pixel, and a second substrate having a plurality of first lines formed along the scanning lines and a plurality of second lines formed along the data lines, for position sensing. The black matrix is used as the position sensor input device.

9 Claims, 20 Drawing Sheets

POSITION SENSIBLE LIQUID CRYSTAL DISPLAY DEVICE

This is a continuation of application Ser. No. 08/916,532, filed Aug. 22, 1997 U.S. Pat. No. 5,963,277, all of which are incorporated herein by reference.

BACKGROUND OF THE INVENTION

1. Field of the Invention

The present invention relates to a position sensible liquid crystal display (PSLCD) device, and more particularly, to a position sensible liquid crystal display device having the capability of sensing the precise position of a stylus on the display.

2. Discussion of the Related Art

In general, as shown in FIG. 1, a liquid crystal display (LCD) device includes an upper plate 3, a lower plate 1, and a liquid crystal sealed between the upper and lower plates. The upper plate 3 has a common electrode 6, a layer of black matrix 4, and a layer of R (red), G (green), and B (blue) color filers 5 that filter light to generate colors. The lower plate has a plurality of data lines and scanning lines arranged at right angles and at fixed intervals to form a matrix of pixel regions therebetween. Each of the pixel regions has a thin film transistor and a pixel electrode. More particularly, lower plate 1 has thin film transistors 2 disposed thereon at fixed intervals, each with a gate electrode G (corresponding to a scanning line), a source electrode S, and a drain electrode D (corresponding to a data line). Each of the pixel regions has a pixel electrode 2a connected to the drain electrode D of the thin film transistor 2. Black matrix 4 on the upper plate 3 blocks light in sections other than pixel electrodes 2a, which corresponds to the R, G, and B color filters 5. Upon selective application of driving signals from external driving circuits to the scanning lines and the data lines, the LCD device displays an image. Recently, much effort has gone into providing the LCD with a position sensor input device so that the LCD can be used like a note book. That is, a position sensible LCD device is used with a position sensor input device to display letters or graphics written with a stylus on the LCD.

FIGS. 2A and 2B illustrate layers in a position sensible LCD device, wherein FIG. 2A illustrates a PSLCD device having an opaque position sensor input device and FIG. 2B illustrates a PSLCD device having a transparent position sensor input device.

The PSLCD device having an opaque position sensor input device includes a PSD (Position Sensor input Device) panel 21, a back light layer 22, an LCD panel 23, and a protective layer 24 arranged in succession. The PSLCD device having a transparent position sensor input device includes a back light layer 22, an LCD panel 23, and a PSD panel 21 arranged in succession.

The operation of the aforementioned PSLCD devices will be explained.

FIG. 3 is a block diagram of the modules of a PSLCD system.

A driving pulse circuit 12 alternately provides driving pulses to the PSD panel 21 in X-, and Y-axis directions. LCD driving circuit 13 provides a driving signal to the LCD in PSLCD 11. Personal computer 14 controls the LCD driving circuit 13. A stylus 15 is sensed according to capacitive coupling occurring in the PSD. A PSD data processing circuit 16 processes a position signal of the stylus 15 to provide position data. Microcomputer 17 controls the driving pulse generating circuit 12 and transfers the position data from the PSD data processing circuit 16 to the personal computer 14. Therefore, the personal computer 14 controls the LCD driving circuit 13 so that the personal computer 14 can display the pixel on which the stylus is placed.

The operation principle of the aforementioned PSLCD module will now be explained in more detail.

Under the control of the microcomputer 17, the driving pulse generating circuit 12 provides driving pulses to X-, and Y-axis of the PSD alternately for sensing the present position of the stylus 15. The stylus 15 senses a position signal in a potential distribution on the PSD using capacitive coupling and provides the position signal to the PSD data processing circuit 16. The PSD data processing circuit 16 receives the present X- and Y-axis coordinate data of the stylus and converts the coordinate data into digitized position data. Upon reception of the position data from PSD data processing circuit 16, the microcomputer 17 analyses the position data to calculate the present position of the stylus 15 and updates personal computer 14 accordingly. Thus, the pixel of the LCD on which the stylus 15 is placed is displayed under the control of the microcomputer 17.

A conventional PSLCD will be explained with reference to the attached drawing.

FIG. 4 illustrates a perspective view of a disassembled conventional transparent PSLCD.

Referring to FIG. 4, the transparent PSLCD includes an LCD panel 31, a PSD 32 on the LCD panel 31, and a protective layer 33. The LCD panel 31 is the conventional LCD shown in FIG. 1. The PSD 32 is adapted to sense a position of the stylus according to a potential distribution of a driving AC signal, and the protective layer 33 is provided for protecting the PSD from the stylus.

FIG. 5 illustrates a plane view of a configuration of a conventional PSD.

Referring to FIG. 5, the conventional PSD includes a tablet 41 (sometimes called "digitizer"), first, second, third and fourth ITO layers 42, 42a, 43 and 43a on four sides of the tablet 41. The tablet 41 has a plurality of grids 44 spaced at fixed intervals in X- and Y-axis directions. The grids 44 in the X- and Y-axis directions are formed with transparent electrodes (ITO) having uniform internal resistances and are isolated from one another. Each of the first and second ITO layers 42 and 42a applies a driving voltage in the X-axis direction for sensing a position of the stylus. Each of the third and fourth ITO layers 43 and 43a applies a driving voltage in Y-axis direction for sensing a position of the stylus. Each of the first, second, third and fourth ITO layers 42, 42a, 43 and 43a has a switch for selective application of a grounding voltage or a source voltage to the grids in X- and Y-axis directions of the tablet 41. The switches in the first and second ITO layers 42 and 42a are denoted XS1 and XS2, respectively, and the switches in the third and fourth ITO layers 43 and 43a are denoted YS1 and YS2, respectively. In the conventional PSD, the first and second ITO layers 42 and 42a and the third and fourth ITO layers 43 and 43a are alternately applied a source voltage Vcc from driving pulse generating circuit 12.

When the switches XS1 and XS2 are switched on, the switches YS1 and YS2 are switched off. If the source voltage is applied to first ITO layer 42 and a ground voltage is applied to the second ITO layer 42a, the potential of the grids 44 in the tablet 41 gradually decrease between the first ITO layer 42 and to the second ITO layer 42a. This is because, although the X- and Y-axes grids have uniform resistances throughout the tablet, if the source voltage Vcc is applied from one side, there will be a potential difference between a grid 44 next to a source voltage input terminal and a grid 44 farthest from the source voltage input terminal because of a potential difference due to distance. By using the characteristic of the grids having the potential difference, it is possible to detect a position of a particular point if a source voltage and a grounding voltage are selectively applied to the X- and Y-axes directions. That is, after selective application of a source voltage and a grounding voltage, potentials in the X- and Y-axis are detected with a stylus, and the present position of the stylus is derived.

FIG. 6 illustrates a potential distribution on the conventional PSD tablet shown in FIG 5. A driving voltage is applied to centers of four sides of the conventional PSD. As shown, when a driving voltage is applied to centers of four sides of the conventional PSD, the potential decreases as it goes from the centers to corners of the tablet. This comes from the potential differences caused by distance differences between the grids at the centers which are nearest to voltage input terminals and the grids at the corners which are farthest from the voltage input terminals.

FIG. 7 illustrates a potential distribution on the tablet when a driving voltage is applied to the four corners of the PSD shown in FIG. 5. In general, in order to sense an exact position of the stylus, a linear potential distribution on the tablet is required. However, if a driving voltage is applied to the four corners of the PSD, as shown in shape "A" of FIG. 7, the potential distribution is non-linear, creating non-active regions "a" and "b," which are not detectable with the stylus. The result is that the smaller region "B" is the only region actually detectable with the stylus. The non-linear form of the non-active region implies that the actual active region also has a non-linear form, which means that an exact position sensing is difficult even in the active region in which the stylus can detect a position.

The aforementioned PSLCD device has the following problems.

First, the addition of the PSD region to the LCD device causes the PSLCD device to be bulky and heavy, and have a higher cost.

Second, the connection of the switching device to every grid makes the fabrication process complicated.

Third, the distortion of driving AC signal applied to the PSD causes the potential, distribution on the tablet to be non-linear.

SUMMARY OF THE INVENTION

Accordingly, the present invention is directed to a position sensible liquid crystal display that substantially obviates one or more of the problems due to limitations and disadvantages of the related art.

According to an aspect of the present invention, a position sensible liquid crystal display device, as embodied and broadly defined herein, includes a first substrate having a plurality of scanning lines, data lines crossing said scanning lines, thin film transistors, and pixels, and a second substrate having a plurality of first lines formed over a plurality of the scanning lines and a plurality of second lines formed over a plurality of the data lines, the first and second lines used to determine a position of an applied stylus, wherein the number of said first lines is substantially less than that of said scanning lines and the number of said second lines in substantially less than the number of said data lines.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 8:
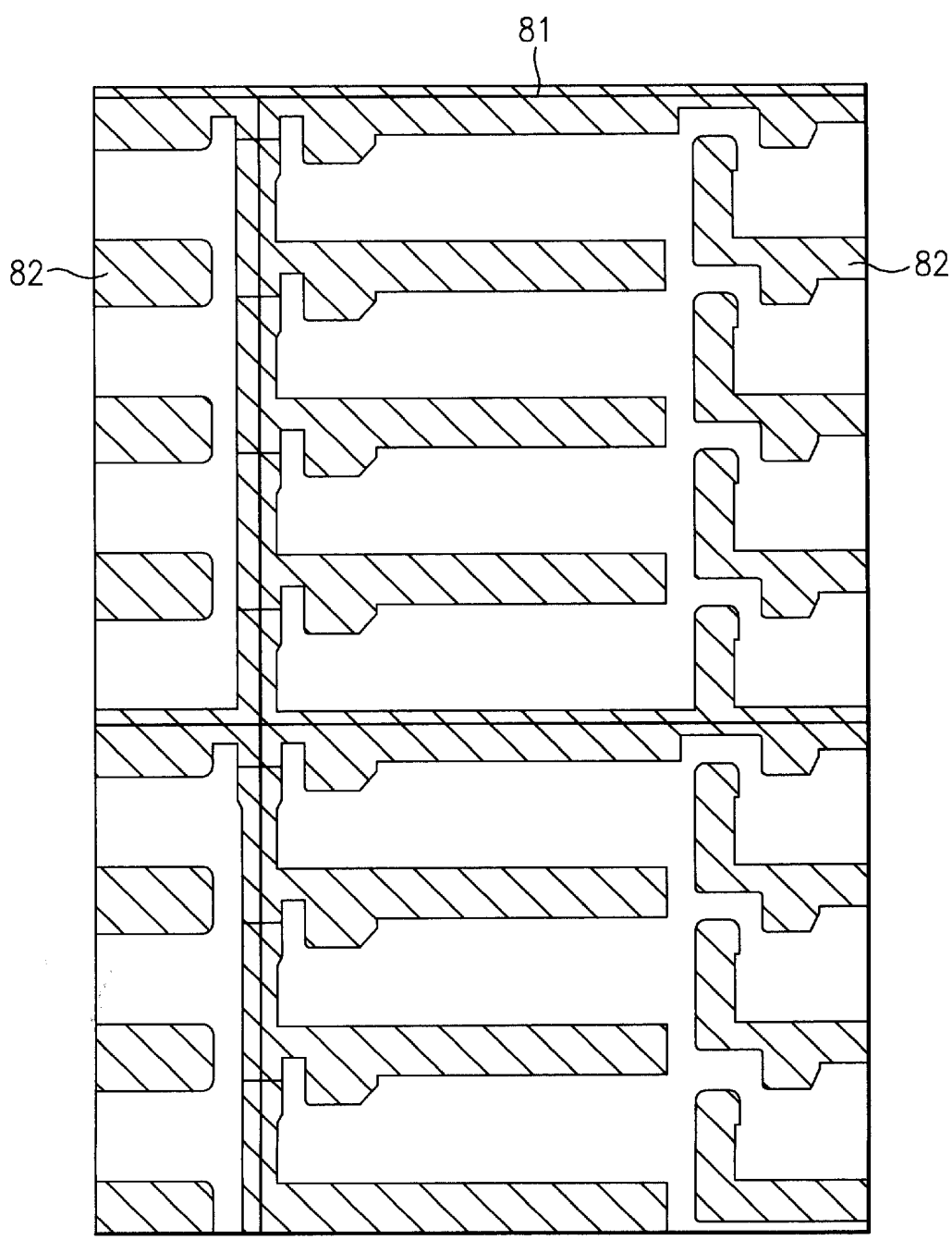
FIG. 8 illustrates a configuration of a black matrix in a PSLCD in accordance with one preferred embodiment of the present invention.

In PSLCD in accordance with the present invention, a black matrix in the LCD is used as a position sensor input device. FIG. 8 illustrates a top view of a black matrix in a PSLCD in accordance with one preferred embodiment of the present invention.

Figure 9:
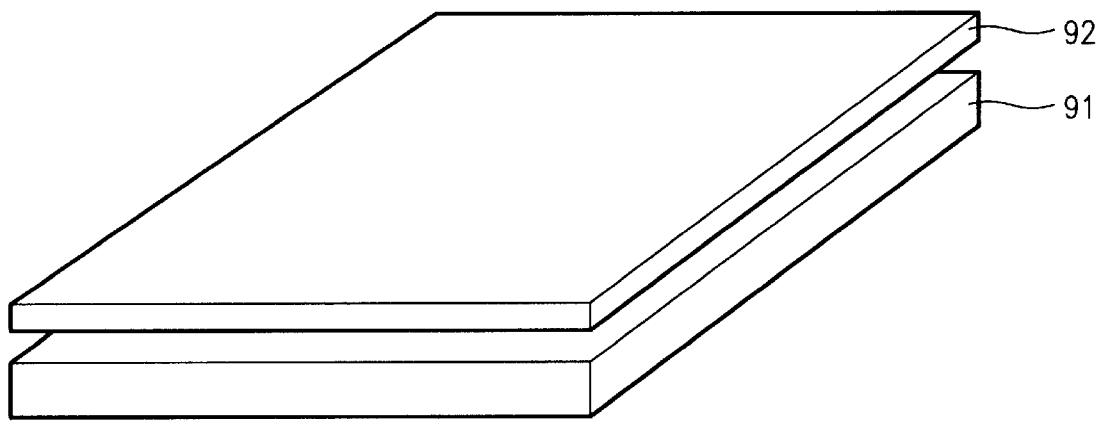
FIG. 9 illustrates a perspective view of a disassembly PSLCD in accordance with a preferred embodiment of the present invention.

Referring to FIG. 8, the black matrix of the present invention consists of two parts; a first black matrix section 81 acting as a grid, and a second black matrix section 82, for blocking light to portions other than pixel regions. Elements of second black matrix section 82 are separated from one another. The black matrix section 81 has elements connected in X-, and Y-axis directions, skipping a plurality of the second matrix elements which are thus separated from one another. This is, the elements of the first black matrix 81 are connected in the up and down (vertical) direction, and left and right sides (horizontal), not for every pixel, but connected in X-, and Y-axes, skipping a plurality of pixels. A line of elements of the black matrix connected in series along an X-axis is an X-axis grid, and a line of elements of the black matrix connected in series along a Y-axis is a Y-axis grid. As explained, the X- and Y-axis grids are disposed to correspond to one of the plurality of scanning lines and the data lines, respectively. FIG. 9 illustrates a perspective view of a disassembled PSLCD in accordance with a preferred embodiment of the present invention. Referring to FIG. 9, the PSLCD of the present invention includes an LCD panel 91 and a protective layer 92. Since the black matrix formed in the LCD panel 91 is utilized as a position sensor input device, no separate position sensor input device is required.

Figure 10:
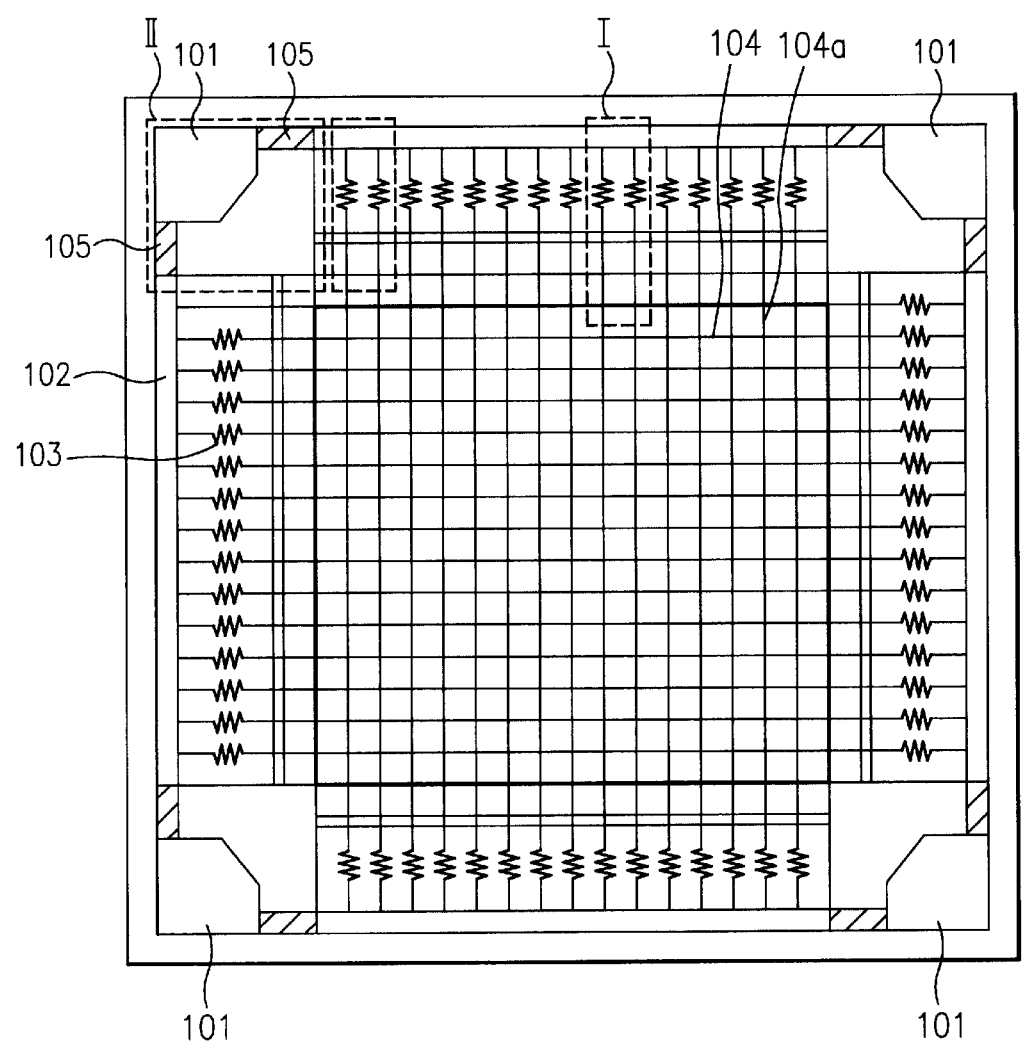
FIG. 10 illustrates a plane view of an upper plate of a PSLCD in accordance with a first embodiment of the present invention.

An upper plate of the PSLCD device of the present invention in which a black matrix is used as a position sensor input device is shown in FIG. 10. FIG. 10 illustrates a plane view of an upper plate of a PSLCD in accordance with a first embodiment of the present invention.

Referring to FIG. 10, the PSLCD in accordance with a first embodiment of the present invention has, disposed on the upper plate, driving signal applying section 101 at four corners of the upper plate, equipotential sustaining resistors 102 between the driving signal applying parts 101, a plurality of equipotential compensating resistors 103 connected in parallel to the equipotential sustaining resistors 102, and X- and Y-axis grids 104 and 104a arranged along X- and Y-axes of the tablet and connected to the equipotential compensating resistors 103. A node resistor 105 is connected between the driving signal applying part 101 and the equipotential sustaining resistor 102. When the aforementioned PSLCD device of the present invention selectively receives a driving AC signal through the driving signal applying parts 101 at the four corners of the upper plate, the driving AC signal is applied to the X-axis grid 104 and Y-axis grid 104a through the equipotential sustaining resistors 102 and the equipotential compensating resistors 103.

Figure 11:
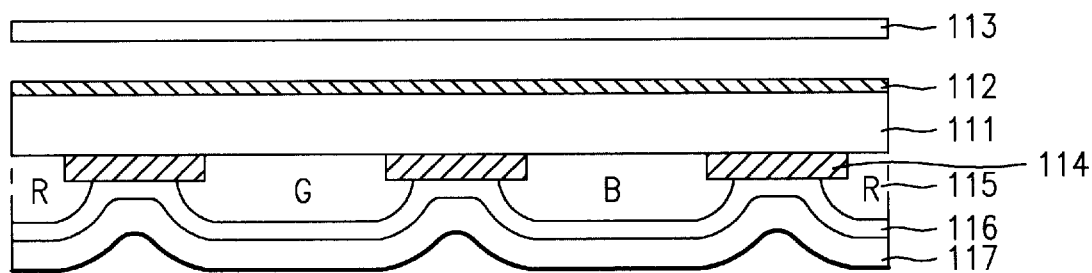
FIG. 11 illustrates a sectional view of an upper plate of a PSLCD in accordance with a first embodiment of the present invention.

FIG. 11 illustrates a sectional view of an upper plate of a PSLCD in accordance with a first embodiment of the present invention.

Referring to FIG. 11, there is a polarizing plate 112 on one face of a glass substrate 111 and a protective layer 113 over the polarizing plate 112 with a space therebetween in the upper plate. There is a black matrix 114 on the other face of the glass substrate 111 and a layer of color filters 115 between elements of the black matrix 114. An overcoated layer 116 extends over the layer of color filers 115 and the layer of the black matrix 114, and an ITO layer 117 of a common electrode on the overcoated layer 116.

The aforementioned PSLCD of the present invention can reduce its volume and lower its cost because the PSLCD does not use a separate PSD, but utilizes the black matrix which is one of the component of an LSD device as the PSD for sensing a position of a stylus.

Figure 12:
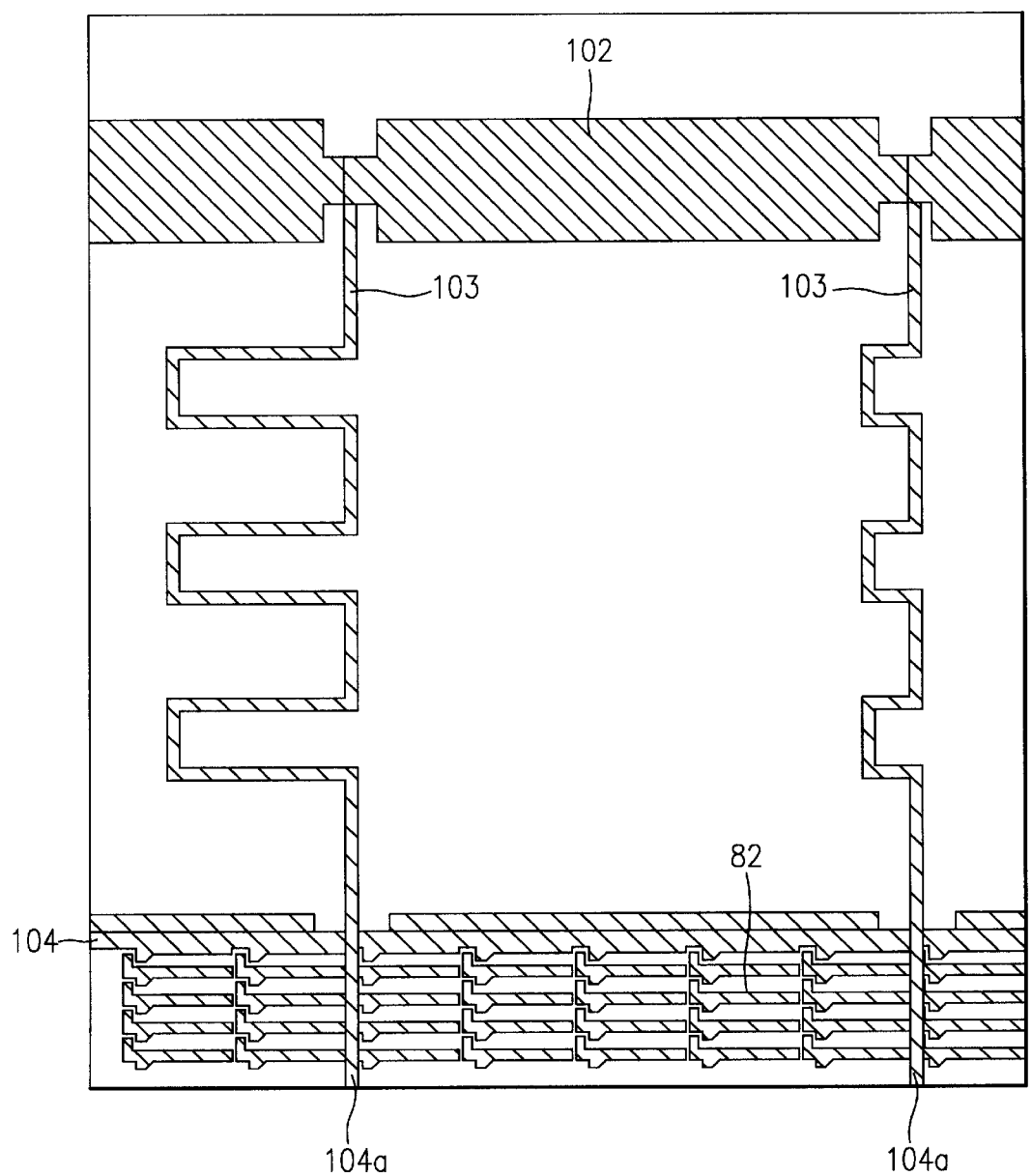
FIG. 12 illustrates enlarged view of "I" part in FIG. 10.
Figure 13:
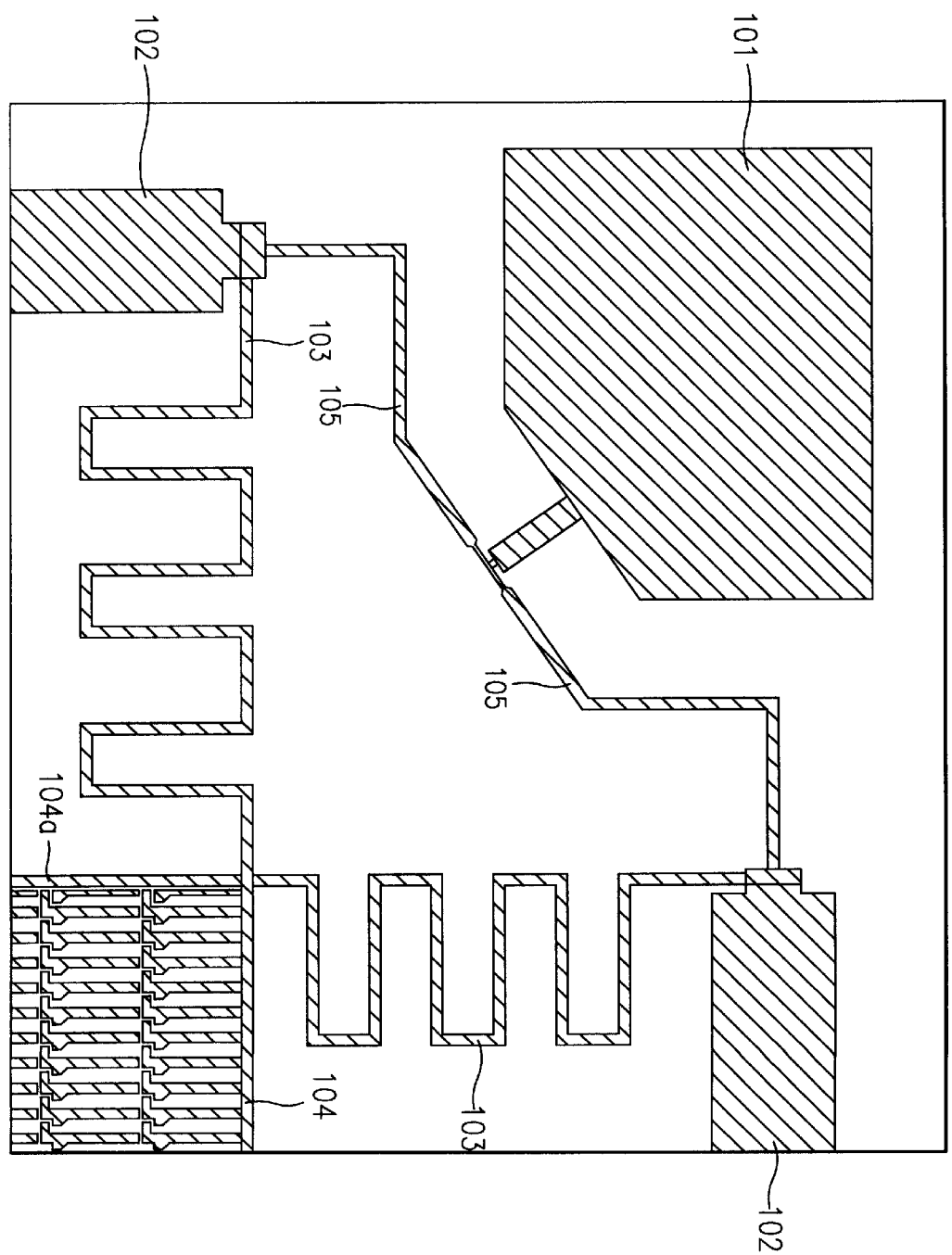
FIG. 13 illustrates an enlarged view of "II" part in FIG. 10.

FIG. 12 illustrates an enlarged view of "I" part in FIG. 10, and FIG. 13 illustrates an enlarged view of "II" part in FIG. 10.

Figure 1:
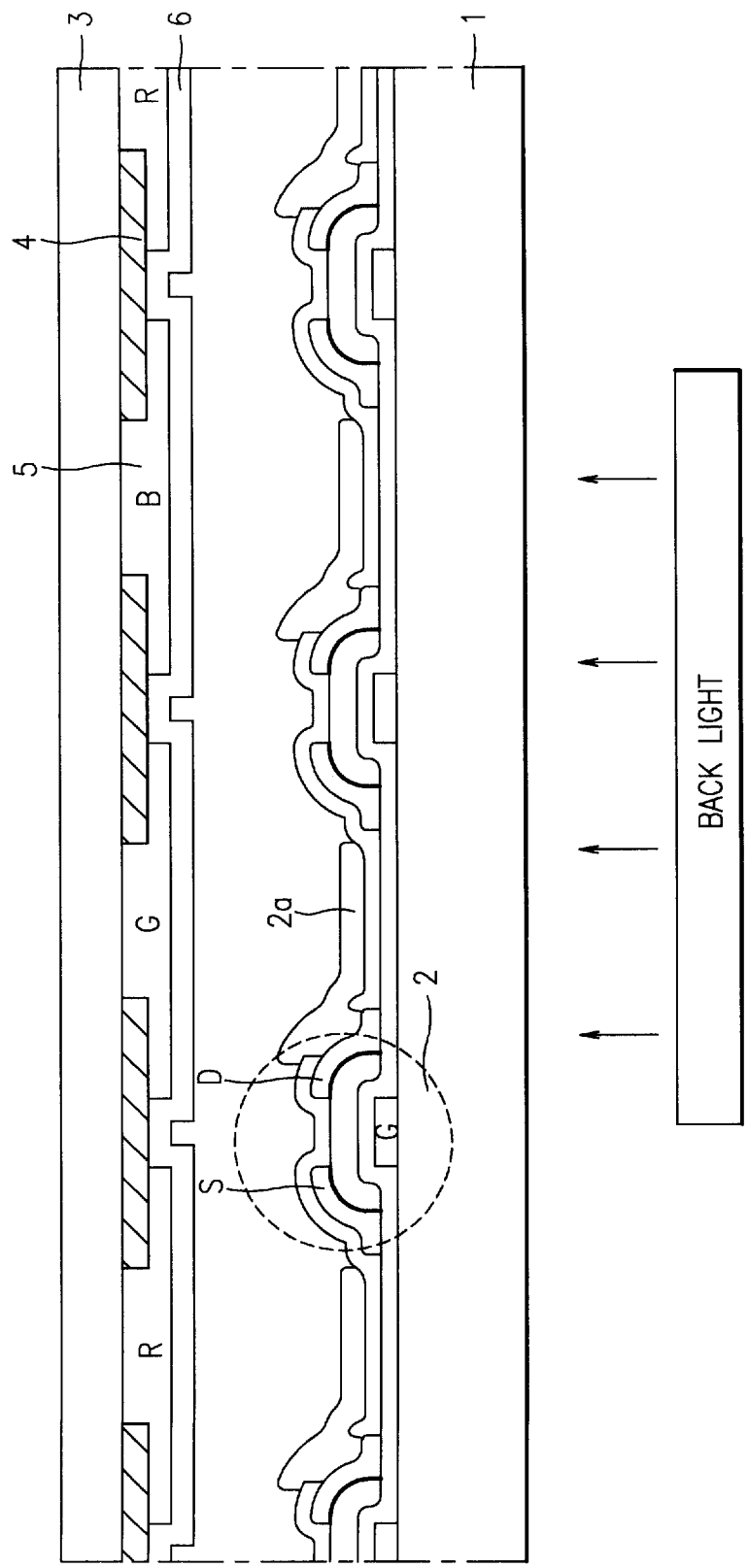
FIG. 1 illustrates a configuration of a conventional liquid crystal display device.
Figure 2A:
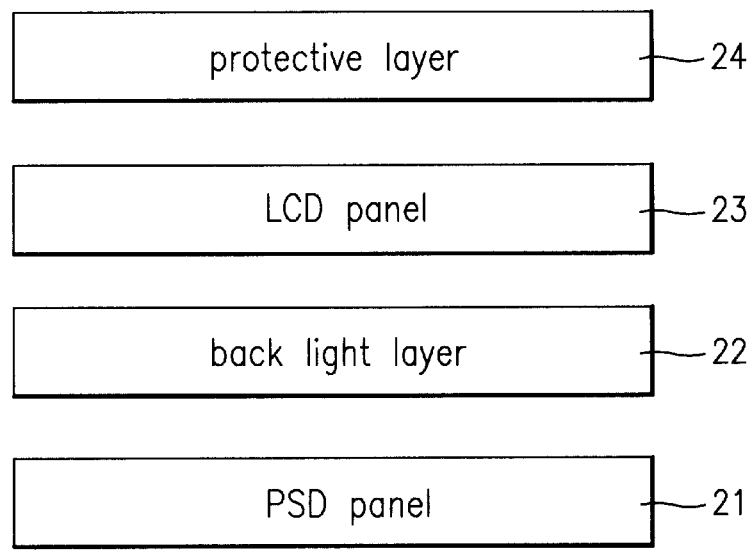
FIG. 2A illustrates a PSLCD device having an opaque position sensor input device.
Figure 2B:
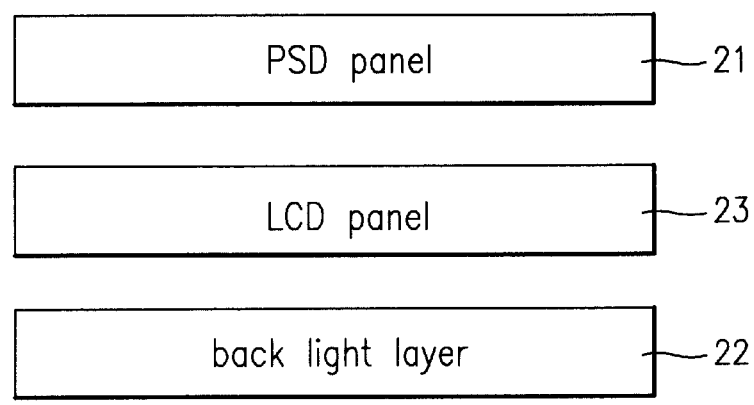
FIG. 2B illustrates a PSLCD device having a transparent position sensor input device.
Figure 3:
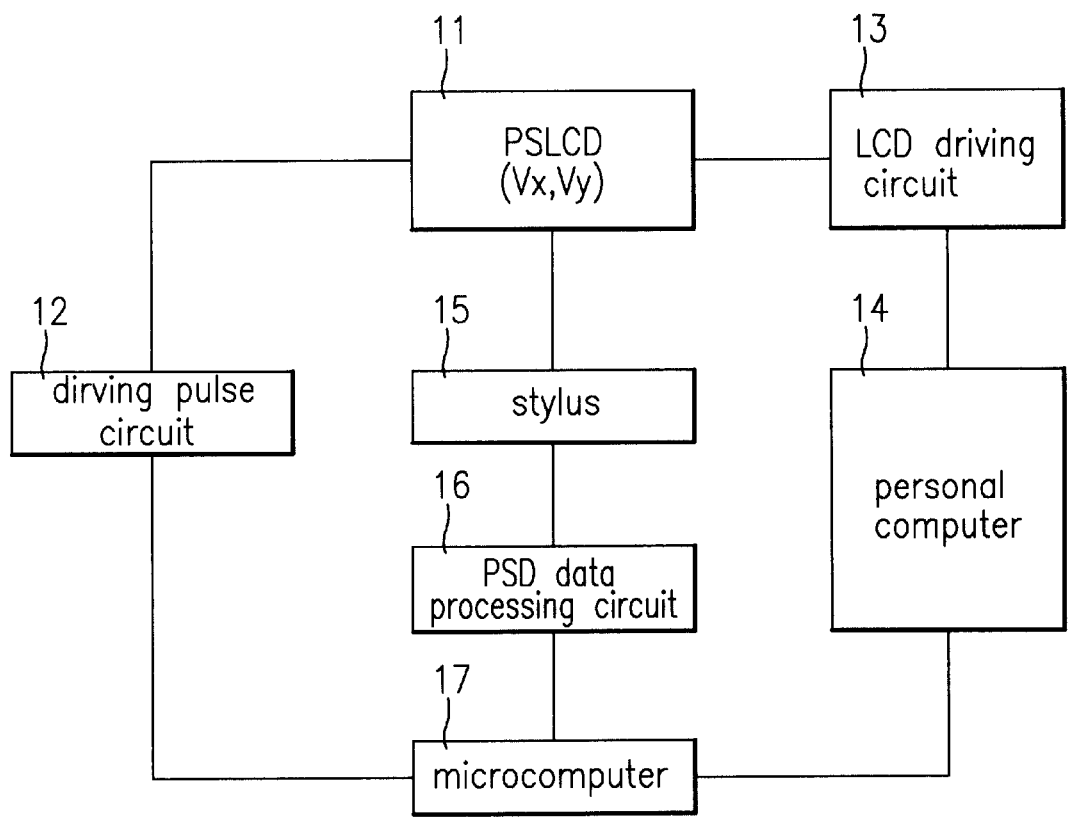
FIG. 3 illustrates a module of a conventional PSLCD system.
Figure 4:
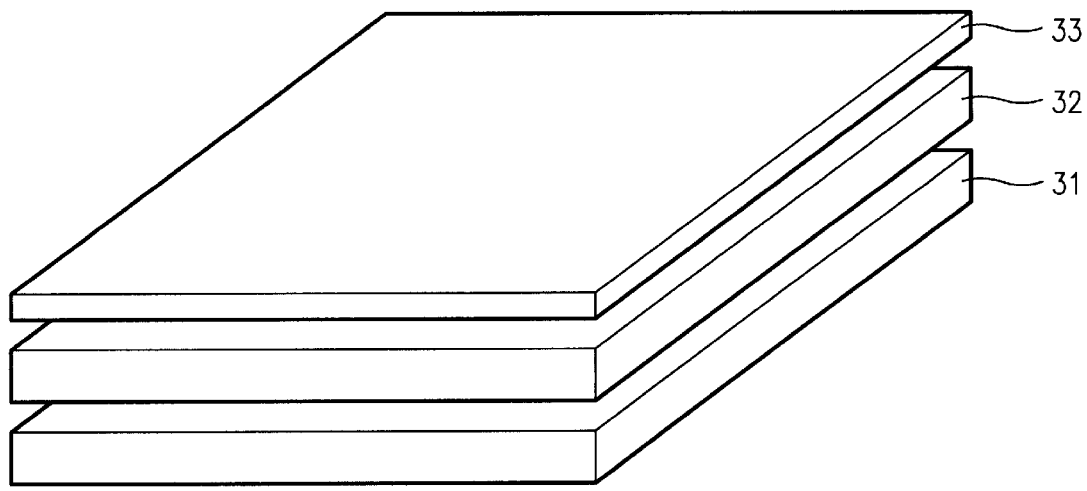
FIG. 4 illustrates a perspective view of a disassembled conventional transparent PSLCD.
Figure 5:
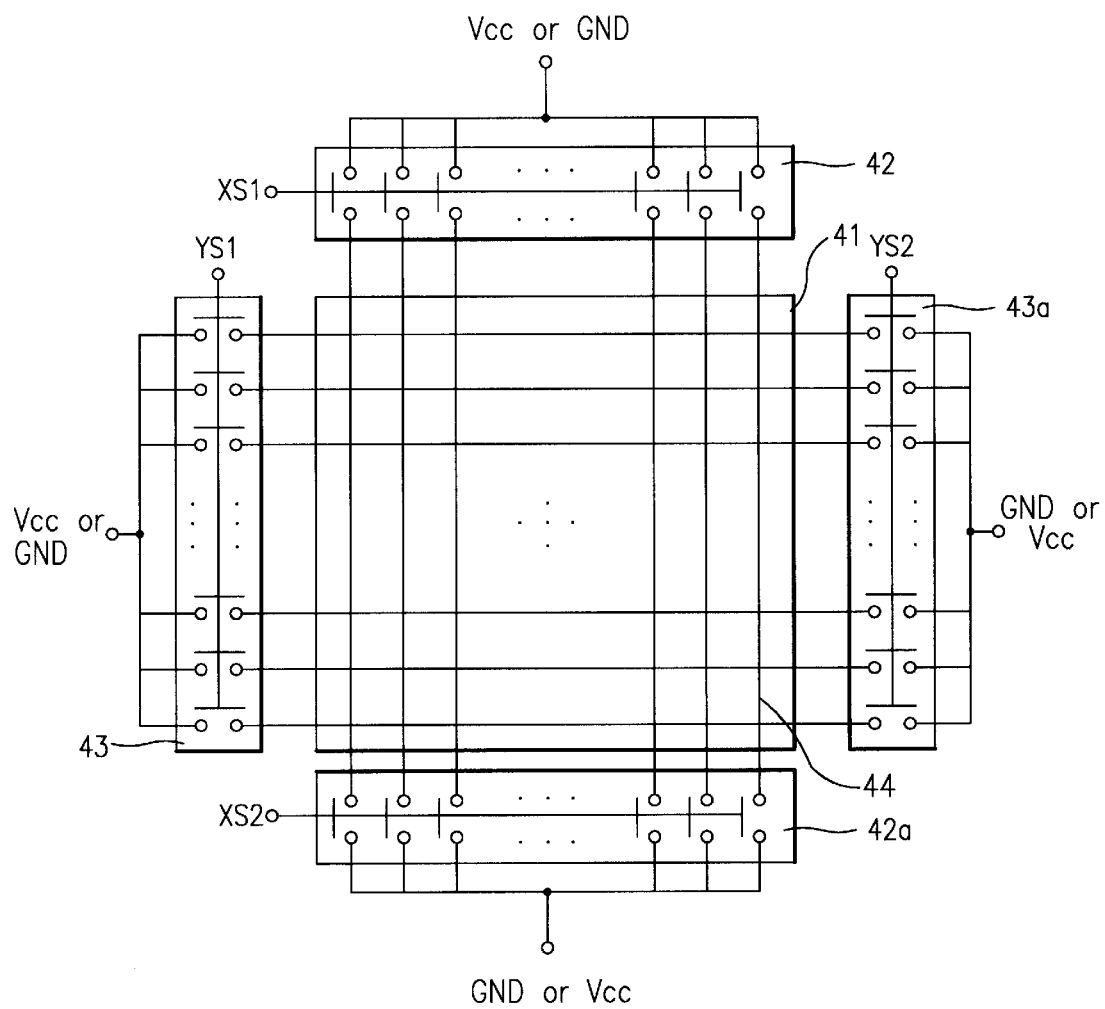
FIG. 5 illustrates a plane view of a configuration of a conventional PSD.
Figure 6:
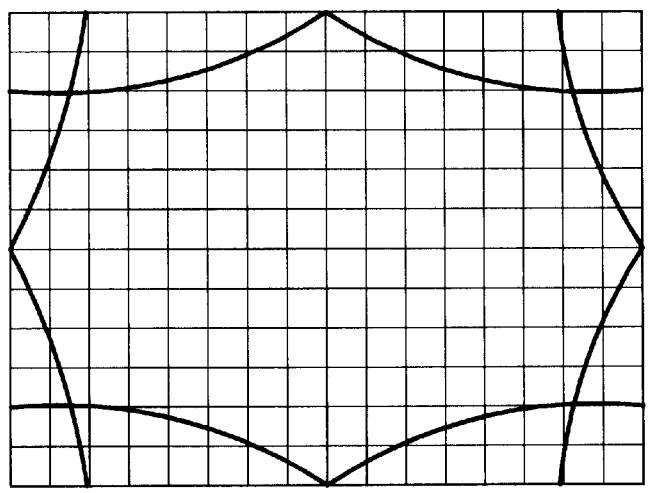
FIG. 6 illustrates a potential distribution on the conventional PSD shown in FIG. 5.
Figure 7:
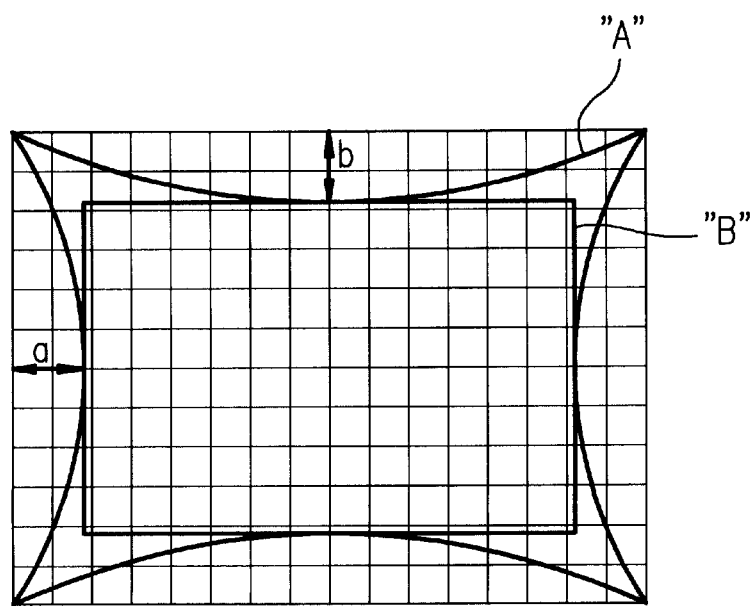
FIG. 7 illustrates a potential distribution on the tablet when a driving voltage is applied to the four corners of the PSD shown in FIG. 5.

Referring to FIG. 12, there is one equipotential sustaining resistor 102 connected to a number of equipotential compensating resistors 103, each of which is connected to Y-axis grid 104a. FIG. 12 only shows the equipotential compensating resistors connected to Y-axis grids 104a, however, equipotential compensating resistors are similarly arranged along the X-axis. A driving AC signal selectively applied to the X-axis grids 104 and Y-axis grid 104a, for sensing a position of the stylus, is received through the driving signal applying parts 101 at the four corners of the upper plate. In the present invention, the equipotential compensating resistors 103 connected to the Y axis grids 104a are patterned to have differing lengths, and therefore differing resistances (see FIG. 12). By varying the resistances of compensating resistors 103 by varying their length, the voltages on Y-axis grid 104a can be equalized, thereby compensating for the problem discussed in FIGS. 5 and 6.

FIG. 13 illustrates the driving signal applying section of the present invention in detail. As shown, the driving signal applying part 101 has a node resistor 105 connected in each of X- and Y-axis directions, which is in turn connected to each of the equipotential sustaining resistors 102 in X- and Y-axes. And, each of the equipotential sustaining resistors 102 is connected to a plurality of the equipotential compensating resistors 103. FIG. 13 only shows one equipotential compensating resistor in each of the X- and Y-axes. The equipotential compensating resistor 103 in the X-axis is connected to a X-axis grid 104, and the equipotential compensating resistor 103 in Y-axis is connected to an Y-axis grid 104a. Therefore, a driving AC signal applied through the driving signal applying section 102 is provided to the X- and Y-axis grids 104 and 104a through the node resistors 105, the equipotential sustaining resistors 102, and the equipotential compensating resistors 103.

Figure 14:
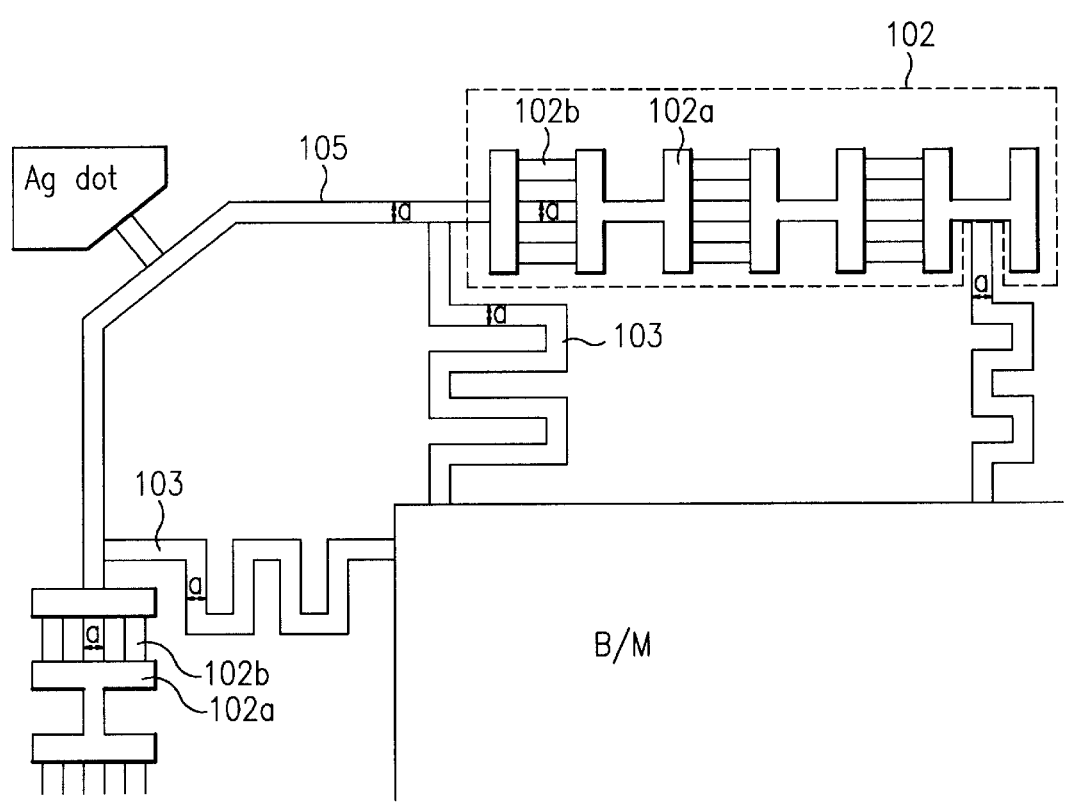
FIG. 14 illustrates equipotential sustaining resistors in accordance with another embodiment of the present invention.

FIG. 14 illustrates equipotential sustaining resistors in accordance with another embodiment of the present invention, wherein the equipotential sustaining resistors, equipotential compensating resistors, and the node resistors 105 between the driving signal applying sections (Ag dots) 101 and the equipotential sustaining resistors 102 are patterned to have the same line widths. Referring to FIG. 14, the equipotential sustaining resistor 102 is formed with a plurality of "H" formed low resistance bodies 102a arranged at fixed intervals with a plurality of high resistance bodies 102b between the low resistance bodies 102a, to electrically connect adjacent low resistance bodies 102a. Equipotential compensating resistors 103 of equal line widths are arranged between the equipotential sustaining resistor 102 and a black matrix B/M. The equipotential compensating resistors 103 and the high resistance bodies 102b in the equipotential sustaining resistors 102 are patterned to have the same line widths, and center potion line widths of the "H" formed low resistance bodies 102a and the line widths of the equipotential compensating resistors 103 are patterned to have the same widths.

Accordingly, all the equipotential compensating resistors 103 have the same line widths so that a driving AC signal has an equal potential at first elements of black matrix for grids to which the driving AC signal provided through the equipotential compensating resistors 103 is applied at the first time. The resistances are adjusted by the lengths. That is, the value of the equipotential compensating resistance R103 varies depending on a critical dimension loss in the fabrication process, and the variance can be expressed in % as: % (W103×R103)/(CW103−CD loss) where W103 is the line width of the equipotential compensating resistor; R103 equipotential compensating resistance; and CD loss in a critical dimension loss during fabrication process. The resistance R103 of the equipotential compensating resistor has a length L103 of the equipotential compensating resistor and the line width W103 of the equipotential compensating resistor. The line width W103 is changed depending on the critical dimension loss to change the resistance. If the PSD has its resistance factors changed in the same ratio, the equipotential sustaining resistors 102 also have to be changed in the same ratio. In the equipotential sustaining resistor 102, through the entire equipotential sustaining resistance is substantially set by the high resistance sections 102b, resistances of the low resistance sections cannot be disregarded.

Therefore, the equipotential sustaining resistor 102 is formed such that it is only influenced by the high resistance bodies 102b, and the line widths of the high resistance bodies 102b in the equipotential sustaining resistor 102 are adjusted such that ratios of resistance changes of the equipotential compensating resistor 103 and the equipotential sustaining resistor 102 are equal. Thus, by forming the line widths of the equipotential sustaining resistors 102 and the equipotential compensating resistors 103 the same and also the line widths of the node resistors 105 between the driving signal applying parts (Ag dots) 101 and the equipotential sustaining resistors 102 the same, ratios of resistance changes of the resistors 102, 103 and 105 are made equal even if the resistances of the resistors 102, 103 and 105 are changed, thereby distortions in the potential distribution caused by process errors are eliminated.

Figure 15:
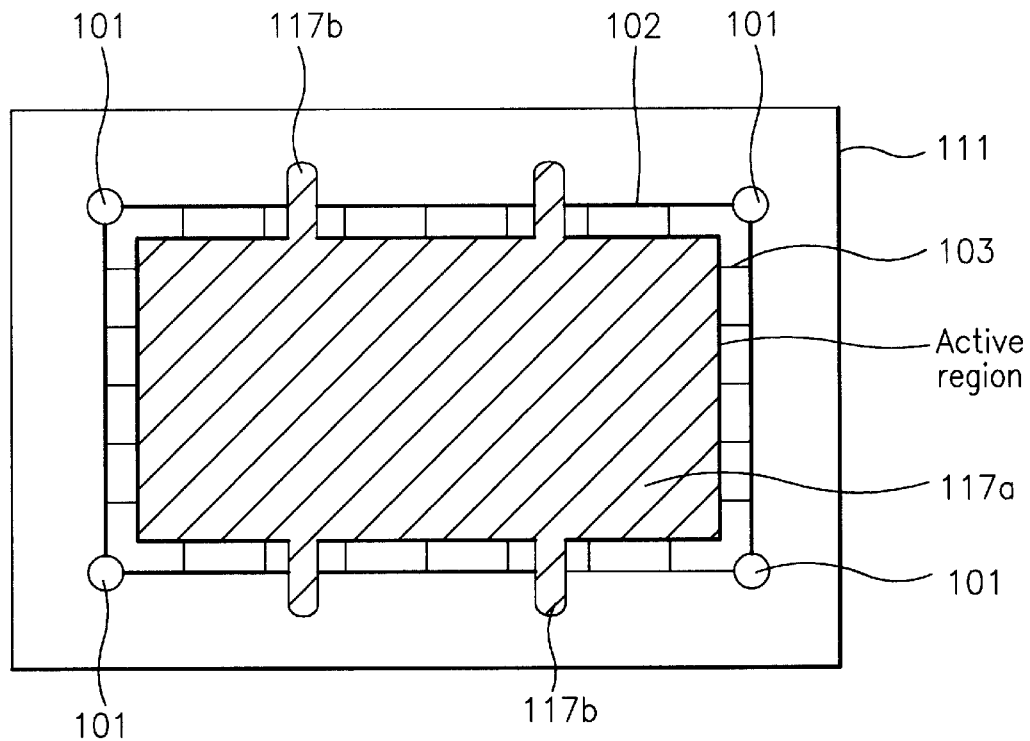
FIG. 15 illustrates a plane view of an upper plate of a PSLCD in accordance with a second embodiment of the present invention.

FIG. 15 illustrates a plane view of an upper plate of a PSLCD in accordance with a second embodiment of the present invention.

Referring to FIG. 11 again, an ITO layer 117 is formed on the entire surface inclusive of the grid black matrix. However, in this embodiment of the present invention, no ITO layer is formed on regions other than the regions having the black matrix. Since the ITO layer is always required in the regions having the black matrix (the active region) as opposite electrodes to the pixel electrodes, but the ITO layer in regions of the equipotential sustaining resistors 102 and the equipotential compensating resistors 103 which do not contribute to the PSLCD device are removed. This is, referring to FIG. 15, the PSLCD in accordance with a second embodiment of the present invention includes driving signal applying sections 101 disposed at the four corners of an upper plate 111, equipotential sustaining resistors 102 disposed and connected between the driving signal applying parts 101 for compensating potential differences, an active region having X- and Y-axis grids for position sensing and a first ITO layer 117a formed thereover on inner sides of the equipotential sustaining resistors 102, and equipotential compensating resistors 103 formed between the active region and the equipotential sustaining resistors 102 at fixed intervals. In addition to the first ITO layer 117a, second ITO layers 117b are formed on the outer sides of the equipotential sustaining resistors 102 on the upper plate at fixed intervals for applying a Vcom signal to the first ITO layer 117a over the active region. The second ITO layer 117b are connected to the first ITO layer 117a.

The PSLCD in accordance with the second embodiment of the present invention causes no interference between the equipotential sustaining resistors and the black matrix because there is no ITO layer over the equipotential sustaining resistors.

Figure 16:
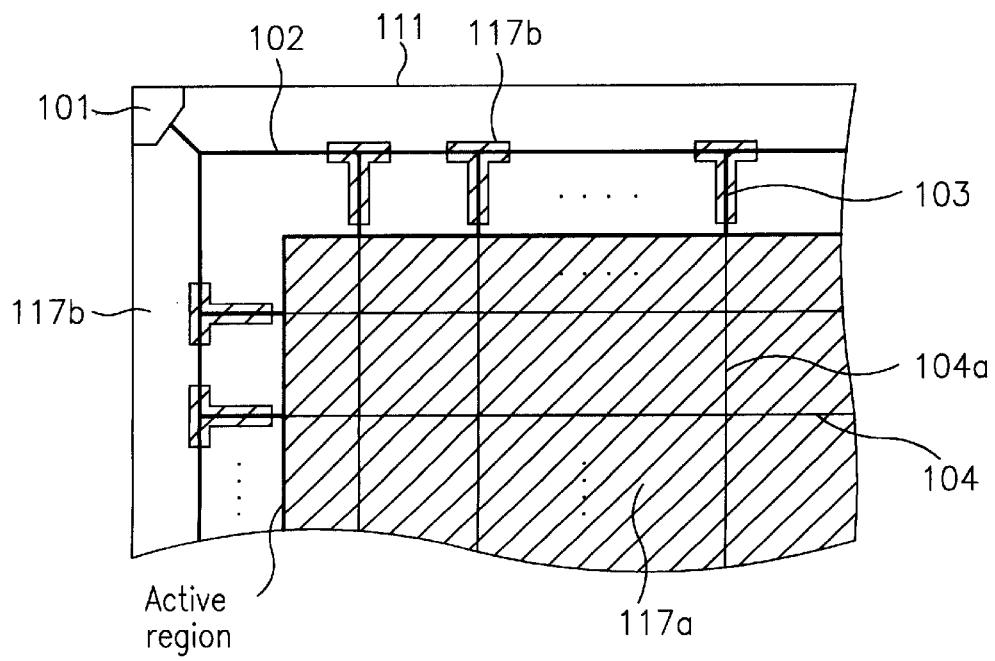
FIG. 16 illustrates a plane view of an upper plate of a PSLCD in accordance with a third embodiment of the present invention.

FIG. 16 illustrates a plane view of an upper plate of a PSLCD in accordance with a third embodiment of the present invention, which is a variation of the PSLCD shown in FIG. 15.

Referring to FIG. 16, the PSLCD in accordance with a third embodiment of the present invention includes driving signal applying sections 101 formed at four corers of the upper plate 111, equipotential sustaining resistors 102 formed in X- and Y-axis directions and connected to the driving signal applying parts 101, equipotential compensating resistors 103 formed at fixed intervals connected to one of the equipotential sustaining resistors 102, an active region having X-axis grids 104 and Y-axis grids 104a connected to the equipotential compensating resistors 102, a first ITO layer 117a formed over the active region, and "T" formed second ITO layers 117b, each formed to have a predetermined width on a portion of the equipotential sustaining resistor 102 where the equipotential sustaining resistor 102 and the equipotential compensating resistor 103 are connected, inclusive of the equipotential compensating resistor 103. Since the active region has an area equal to the area of the active region of the LCD device, the region of the first ITO layer 117a coincides with the active region of the LCD device. Therefore, considering the active region of the LCD device, it is known that the area of the active region of the PSLCD device is as large as possible. The width of the second ITO layer 117b is wider than the width of the equipotential sustaining resistors 102 or the equipotential compensating resistors 103. And, the first ITO layer 117a is separated from the second ITO layers 117b. This separation of the first ITO layer 117a from the second ITO layers 117b can prevent the capacitive coupling between the black matrix used as grids and the second ITO layers 117b, allowing prevention of distortions of the potential distribution caused by capacitive coupling. In other words, though "T" formed second ITO layers 117b are formed on portions of every equipotential sustaining resistor 102 and the equipotential compensating resistor 103, since the second ITO layers 117b are isolated from the first ITO layer 117a and the second ITO layers themselves, distortion of the potential distribution caused by the capacitive coupling is reduced. Hence, an initial driving AC signal applied through the driving signal applying parts 101 is not distorted in the paths through the equipotential sustaining resistors 102 and the equipotential compensating resistors 103, the potentials at the first black matrix elements of the X-axis grids 104 and Y-axis grids 104a become to have the same potentials.

Figure 17:
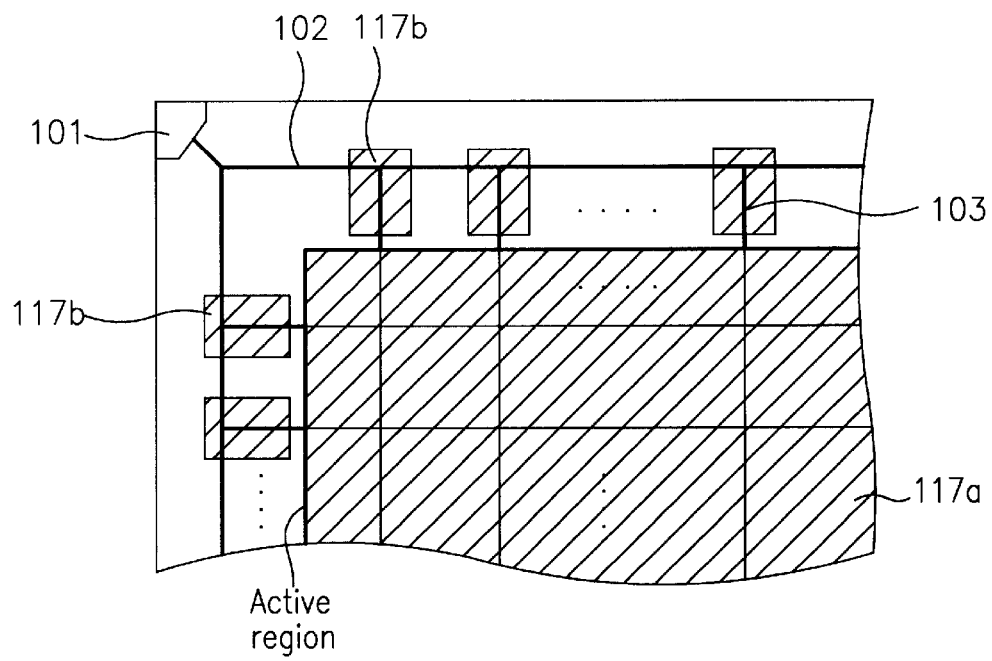
FIG. 17 illustrates a plane view of an upper plate of a PSLCD in accordance with a fourth embodiment of the present invention.

FIG. 17 illustrates a plane view of an upper plate of a PSLCD in accordance with a fourth embodiment of the present invention.

Referring to FIG. 17, the PSLCD in accordance with a fourth embodiment of the present invention has the second ITO layers 117b explained in the third embodiment, patterned not in the "T" forms, but in rectangular forms. By patterning in rectangular forms, the same advantages explained in connection with the third embodiment can be obtained while patterning the second ITO layers 117b with ease.

Figure 18:
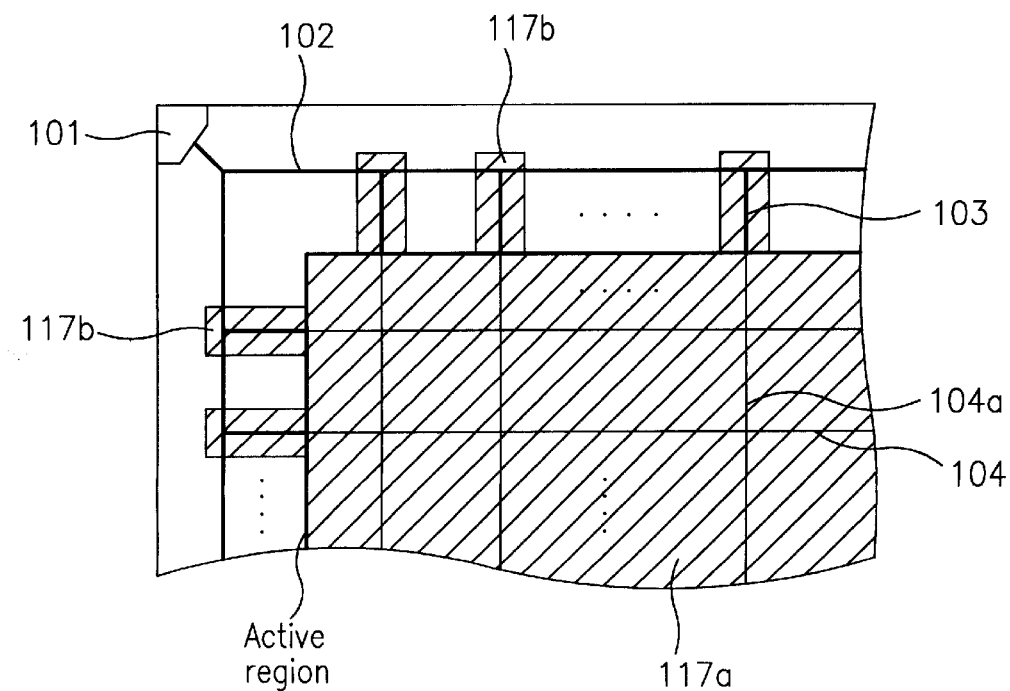
FIG. 18 illustrates a plane view of an upper plate of a PSLCD in accordance with a fifth embodiment of the present invention.

FIG. 18 illustrates a plane view of an upper plate of a PSLCD in accordance with a fifth embodiment of the present invention, wherein the first layer 117a over the active region and the second ITO layers 117b over the equipotential sustaining resistors 102 and the equipotential compensation resistors 103 are formed to be integrated. This integral formation of the first and second ITO layers 117a and 117b produces an excellent blocking effect of a signal provided from a source IC and a gate IC.

Figure 19:
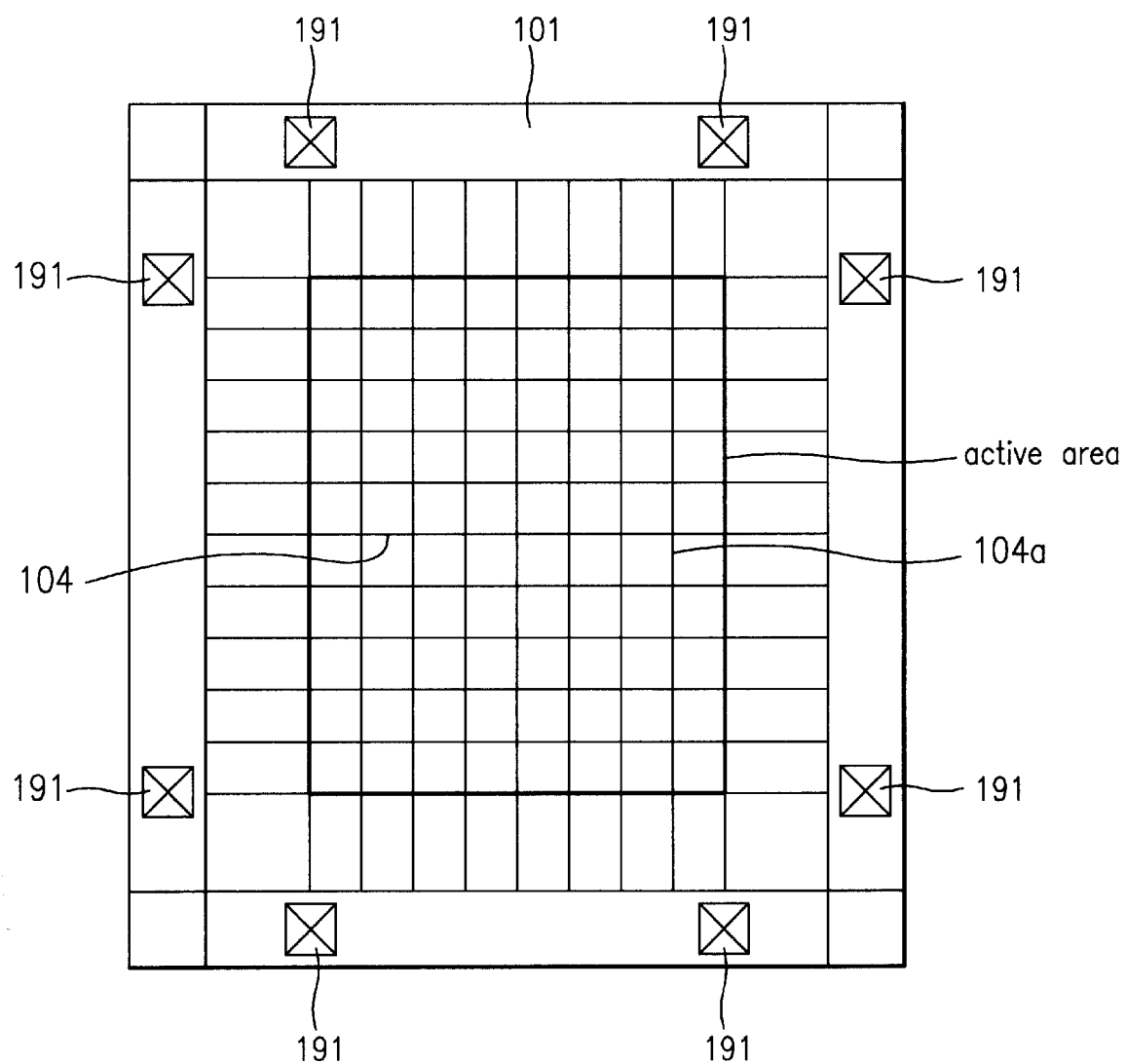
FIG. 19 illustrates a plane view of an upper plate of a PSLCD in accordance with a sixth embodiment of the present invention.

FIG. 19 illustrates a plane view of an upper plate of a PSLCD in accordance with a sixth embodiment of the present invention, wherein the driving signal applying parts 101 are formed, not at the four corners of the upper plate 111, but integral with the upper plate 111. This is, referring to FIG. 19, the PSLCD in accordance with a sixth embodiment of the present invention includes driving signal applying sections 101 formed at the periphery of the upper plate 111 in X- and Y-axis directions, driving signal transmission sections 191 formed at fixed intervals at the periphery of the upper plate for transmission of the driving AC signal from a lower plate (not shown) to the upper plate, and X-axis grids 104 and Y-axis grids 104a of the black matrix. The driving signal applying sections 101 apply the driving AC signal received from the lower plate through the driving signal transmission section 191 to the X-axis grid 104 and the Y-axis grid 104a. When the driving AC signal is applied to the driving signal applying section 101 at the upper part of the upper plate 11, the lower part of the upper plate 11 is grounded. Thus, as the driving AC signal flows through the Y-axis grids distributing a potential in Y-axis direction, a Y-axis coordinate of a position of the stylus can be sensed. This is also applicable to the X-axis. The driving signal transmission parts 191 are formed of silver.

Figure 20:
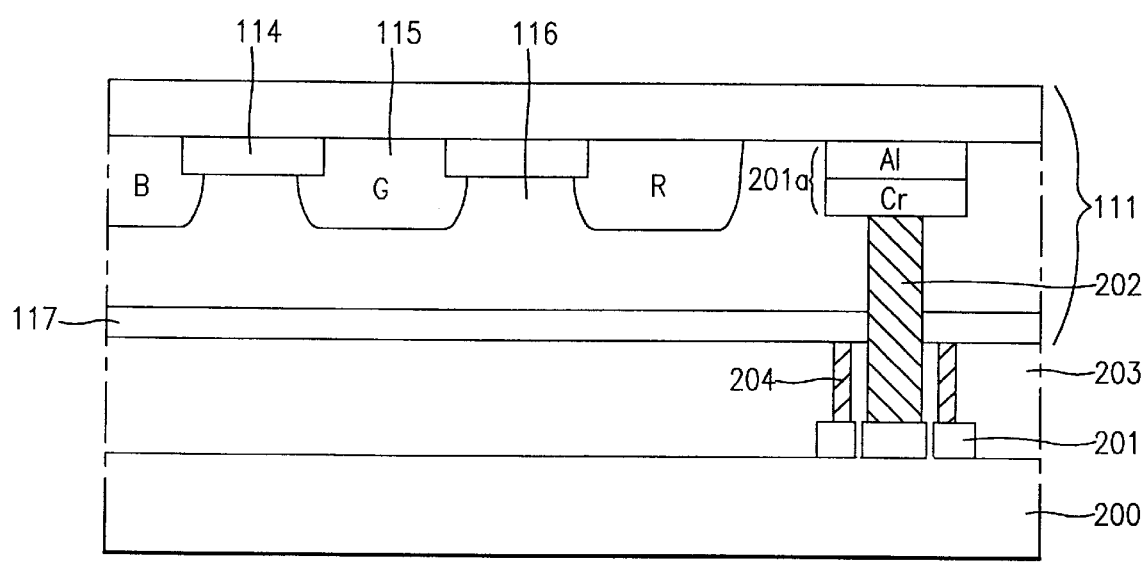
FIG. 20 illustrates a sectional view of an upper plate of a PSLCD in accordance with a sixth embodiment of the present invention.

FIG. 20 illustrates a sectional view of the upper plate of a PSLCD in accordance with the aforementioned sixth embodiment of the present invention.

Referring to FIG. 20, the PSLCD in accordance with the aforementioned sixth embodiment of the present invention includes a lower plate 200 having data lines and scanning lines, with thin film transistors and pixel electrodes arranged at the crossing points of the lines, a black matrix 114 formed on the upper plate for shielding light incident to portions other than the pixel electrodes, a layer of color filters 115 formed between elements of the black matrix 114, an overcoat layer 116 formed to extend over the layer of color filters 115 and the black matrix 114, an upper plate 111 having an ITO layer 117 on the overcoated layer 116, a plurality of lower plate driving signal applying sections 201 formed on the lower plate 200 at fixed intervals, a plurality of upper plate driving signal applying parts 201a formed on the upper plate 111 at fixed intervals, a plurality of first conductive layers 202 formed between the lower plate driving signal applying parts 201 and the upper plate driving signal applying section 201a for transmission of the driving AC signal from the lower plate 200 to the upper plate driving signal applying parts 201, and liquid crystal 203 sealed between the upper plate and the lower plate. A second conductive layer 204 is formed around the first conductive layer 202 to provide a common voltage to the ITO layer 117 of a common electrode. The first and second conductive layers 202 and 204 are formed of silver, and the upper plate driving signal applying sections are formed with layers of aluminum and chromium. In the aforementioned sixth embodiment of the present invention, the driving AC signal for sensing a position of the stylus is transmitted through the X-axis grids 104 and Y-axis grids 104a through paths consisting of the lower plate driving signal applying parts 201—the first conductive layers 202 the upper plate driving signal applying part 201a.

As has been explained, the PSLCD device of the present invention has a reduced volume and cost because it uses the black matrix as the position sensor input device in sensing position of a stylus, and allows more exact position sensing because unnecessary ITO is removed, which prevents interferences between the ITOs and between the ITO and the black matrix, and secures the active region as much as possible.

Figure 21:
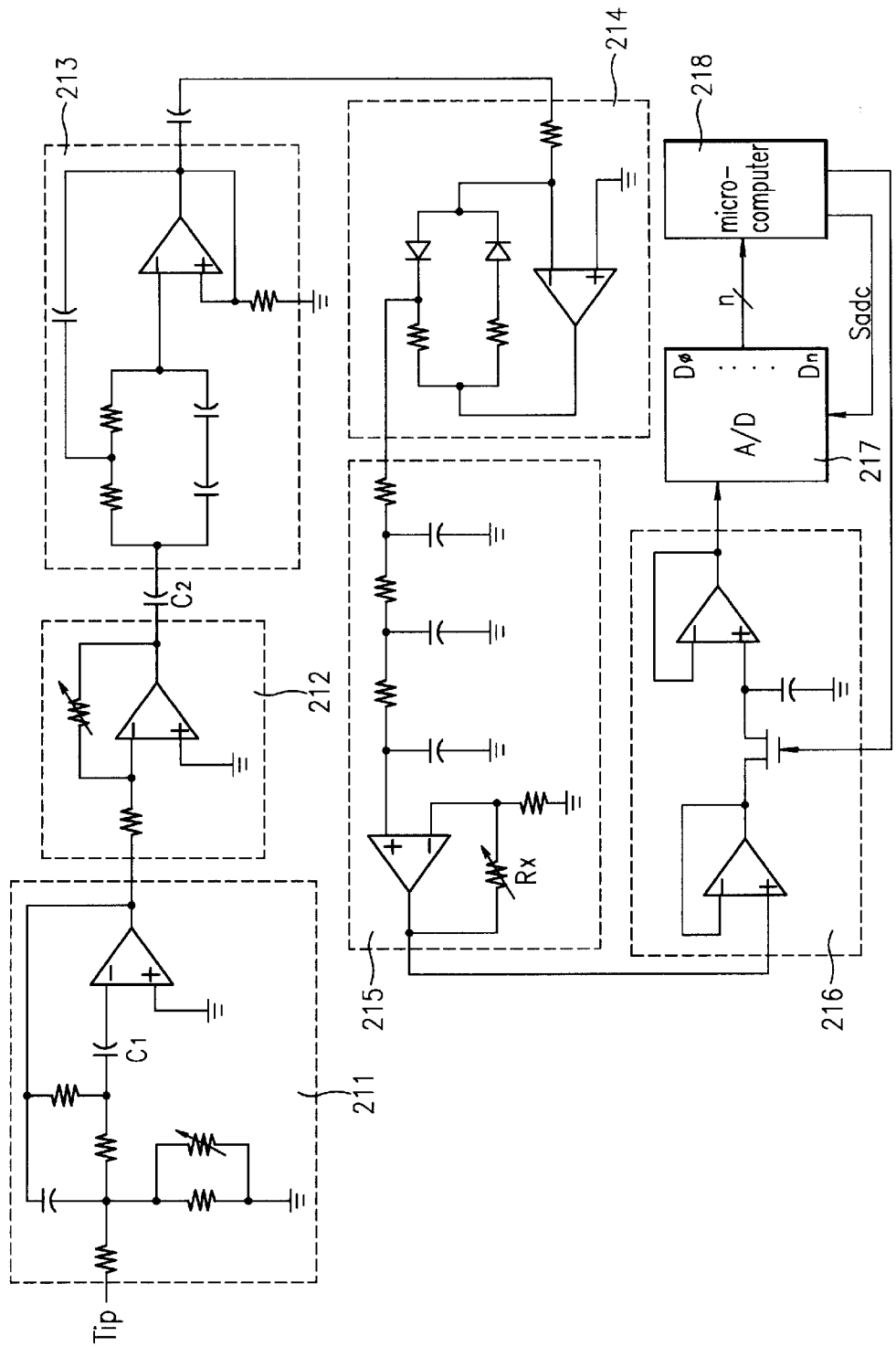
FIG. 21 illustrates a circuit of a device for processing a sensed position signal in accordance with one preferred embodiment of the present invention.

FIG. 21 illustrates a circuit of a device for processing a position signal in accordance with one preferred embodiment of the present invention, wherein the black matrix used as the PSD is formed of an alloy of chromium and aluminum.

Referring to FIG. 21, the circuit of a device for processing a sensed position signal in accordance with one preferred embodiment of the present invention includes a band pass filter section 211 for receiving a driving AC signal and providing a driving AC signal of a desired frequency band, a first amplifying section 212 for amplifying the driving AC signal from the band pass filter section 211, a capacitor C2 connected to the first amplifying section 212 in series for removing a DC component from the amplified driving AC signal, a band restricting filter section 213 for removing a noise component from the signal passed through the capacitor C2, a rectifying section 214 for rectifying the signal from the band restricting filter part 213, a low pass filter section 215 for providing only a signal of a low pass component from the rectified signal, a second amplifying section 216 for amplifying the signal from the low pass filter part 215 to an amplitude meeting a range of input voltage of an analog to digital converting part in the next step, the analog to digital converting section 217 for converting an analog signal amplified in the second amplifying part 216 to a digital signal, a microcomputer 218 for controlling the analog to digital converting part 217 and calculating a position of the stylus according to a received data.

The operation of the aforementioned device for processing a position signal will be explained.

The band pass filter section 211 only passes a signal of a desired frequency band of a driving AC signal sensed at a tip of the stylus (a signal indicating the present position of the stylus). That is, a signal with noise is removed before amplifying the position signal from the stylus. The driving AC signal passed through the band pass filter part 211 is amplified to a certain level in the first amplifying part 212. A DC component contained in the signal from the first amplifying part 212 is removed in the capacitor C2. Noises still present in the signal even after removal of the noise in the band pass filter section 212 coming from the LCD and interferences between various signals are removed in the band restricting filter section 213. That is, the band restricting filter section 213 limits signals of frequency bands with noise components to provide a driving AC signal without noise. The driving AC signal passed through the band restricting filter section 213 is rectified in the rectifying section 214 and provided to the low pass filter section 215. The low pass filter section 215 having a plurality of resistors and a plurality of capacitors limits a high frequency band and allows a low frequency band to pass. Therefore, the low pass filter part 215 provides a peak value of the signal passed through the rectifying part 214 as a DC component of a signal. The DC component signal is amplified in the second amplifying section 216 and provided to the analog to digital converting part 217. The analog to digital converting part 217 then digitizes the analog signal into a digital signa upon reception of a signal to digitize the analog signal into a digital signal (that is, an Sade) from the microcomputer 218. A position data digitized under the control of the microcomputer 218 is provided to the microcomputer 218, and calculated of a position of stylus based on the received data.

Figure 22:
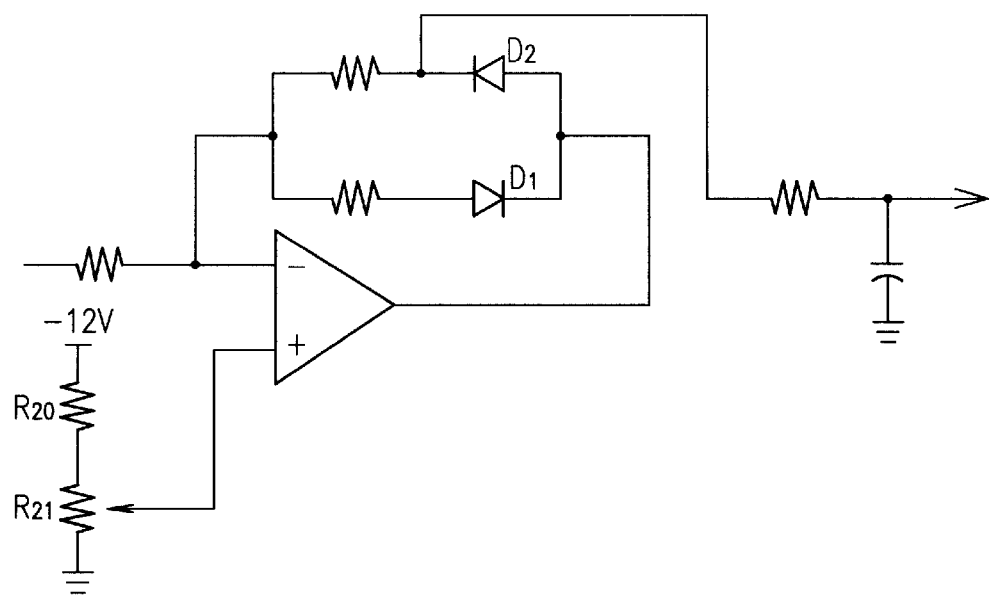
FIG. 22 illustrates another embodiment of a rectifying part for the device for processing a sensed position signal in accordance with one preferred embodiment of the present invention.

FIG. 22 illustrates another embodiment of the rectifying section shown in FIG. 21.

Referring to FIG. 22, in the another embodiment, resistors R20 and R21 provide a non-inversion terminal(+) of an amplifier for dividing a voltage between a negative voltage and a ground voltage, with which a DC level offset caused by a noise component can be compensated.

Figure 23:
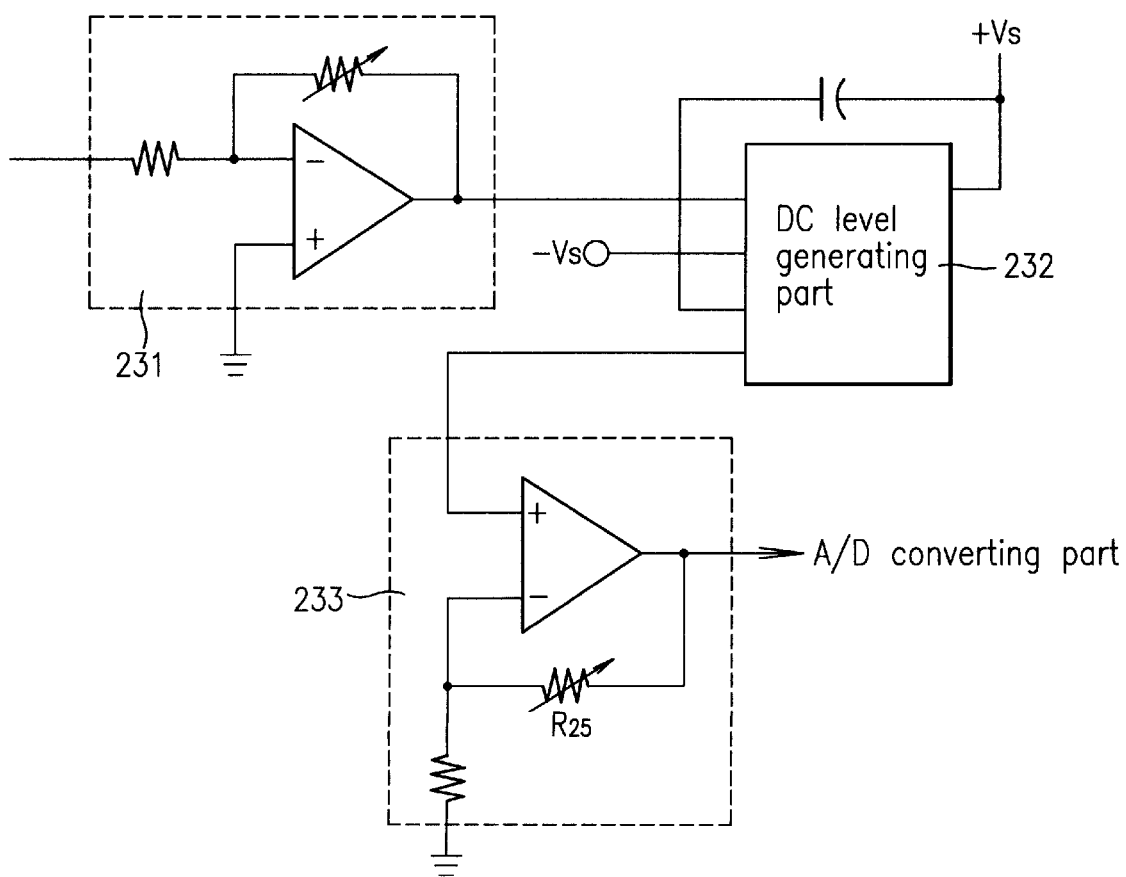
FIG. 23 illustrates another embodiment of a circuitry system of the rectifying part-low band pass filter part-DC level generating part shown in FIG. 21; and, FIG. 24 illustrates a circuit of a device for processing a sensed positions signal in accordance with a second preferred embodiment of the present invention.

FIG. 23 illustrates another embodiment of a circuitry system of the rectifying part-low band pass filter part-DC level generating section shown in FIG. 21.

Referring to FIG. 23, a driving AC signal from a band restricting filter section (not shown) is passed through an inversion amplifier 231 and provided to a DC level generating section 232 wherein the driving AC signal is converted into a DC level signal. In the case when the signal provided to the DC level generating part 232 is a sinusoidal wave, the DC level signal can be adjusted by using a variable resistor R25 to obtain a gain of a non-inversion amplifying section 233 to be $\sqrt{2}$ as $V_o\text{-}v_{in}/\sqrt{2}$.

Figure 24:
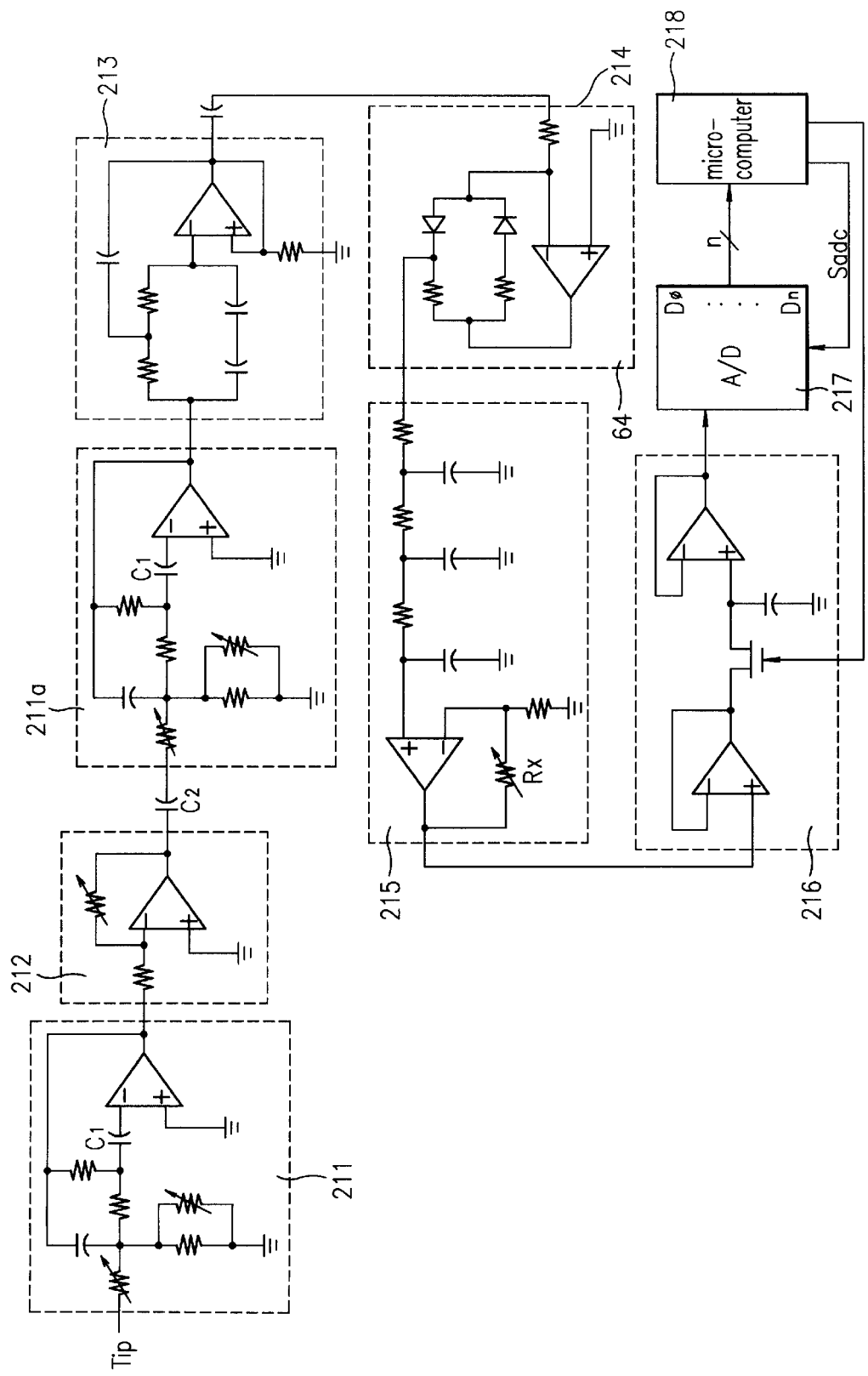

FIG. 24 illustrates a circuit of a device for processing a sensed position signal in accordance with a second preferred embodiment of the present invention.

Though, in the first embodiment of the device for processing a position signal of the present invention, a signal from the band pass filter section 211 is amplified through the first amplifying section 212 and removed of a DC component therein using the capacitor C2 and further removed of noise still present therein using the band restricting filter part 213, in the second embodiment of the present invention, two band pass filter sections 211 and 211a are used. That is, the driving AC signal is removed of the noise using a first band pass filter section 211, amplified to a predetermined amplitude in the first amplifying section 221, removed of the DC component in the capacitor C2, and then, before being provided to the band restricting filter section 213, passed through a second band pass filter section 211a once more. As the second band pass filter section 211a is adapted to have a signal pass band narrower than that of the first band pass filter part 211, the noise that is not yet removed in the first band pass filter section 211 can be removed in the second band pass filter section 211a. In the meantime, since the black matrix used in the second embodiment is formed of an alloy of chromium and nickel, which has a high resistance, an amplitude of the driving signal can be made still greater. Because the amplitude of the driving signal can be increased an amplitude of the position signal can be increased by capacitive coupling, and a more exact position sensing possible. Thus the use of two band pass filter sections allows perfect removal of noise, which in turn allows more exact position sensing.

As has been explained, the PSLCD of the present invention has the following advantages;

First, the use of the black matrix in the LCD as the position sensor input device without using a separate position sensor input device allows for a reduction in size of the PSLCD.

Second, the non-use of separate position sensor input devices allows for a reduction in weight and cost of the device.

Third, the removal of unnecessary ITO simplifies the fabrication process and eliminate interferences between the ITOs and between the ITO and the black matrix, allowing an exact position sensing.

Fourth, the prevention of distortion in the potential distribution by removal of noise contained in the driving AC signal allows still more exact position sensing.

It will be apparent to those skilled in the art that various modifications and variations can be made in the position sensible liquid crystal display device of the present invention without departing from the spirit or scope of the invention. Thus, it is intended that the present invention cover the modifications and variations of this invention provided they come within the scope of the appended claims and their equivalents.

What is claimed is:

1. A position sensor input device on a first substrate comprising:
    a grid pattern;
    a driving signal applying section;
    an equipotential sustaining resistor electrically connected to the driving signal applying section; and
    a plurality of equipotential compensating resistors connecting the equipotential sustaining resistor to the grid pattern,
    wherein the equipotential sustaining resistor includes a plurality of first resistance bodies arranged in one direction at fixed intervals, and at least two second resistance bodies disposed between and connected to adjacent first resistance bodies.

2. The device according to claim 1, wherein the resistance of the first resistance bodies is lower than the resistance of the second resistance bodies.

3. The device according to claim 1, wherein the second resistance bodies and the equipotential compensating resistors have equal line width.

4. The device according to claim 1, wherein the at least two second resistance bodies are arranged in parallel between the first resistance bodies.

5. The device according to claim 1, wherein each of the plurality of first lines are connected to the equipotential compensating resistor.

6. The device according to claim 1, wherein the equipotential compensating resistors closer to the driving signal applying section have longer line length than equipotential compensating resistors farther from the driving signal applying section.

7. The device according to claim 1, further including:
   a second substrate having a driving signal applying part;
   a liquid crystal layer; and
   a conductive layer between the first and second substrates, the conductive layer electrically connecting the driving signal applying part to the driving signal applying section.

8. The device as claimed in claim 1, wherein the grid pattern includes a plurality of first lines and a plurality of second lines forming a matrix.

9. The device as claimed in claim 1, wherein the device further includes a node resistor between the driving signal applying section and the equipotential sustaining resistor.

* * * * *